March 29, 1927.  1,622,646
L. S. R. HOPKINS ET AL
BACTERIAL SEWAGE TANK
Filed May 13, 1926
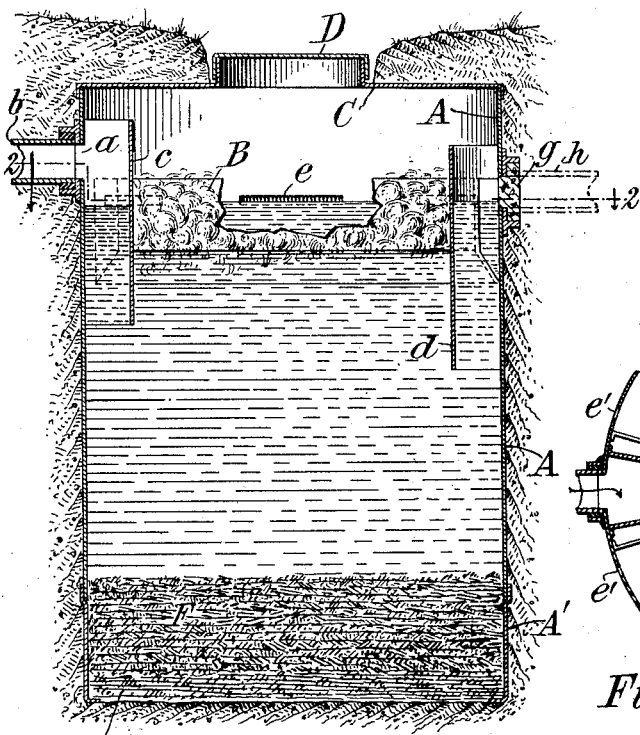
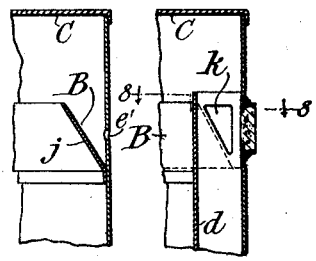
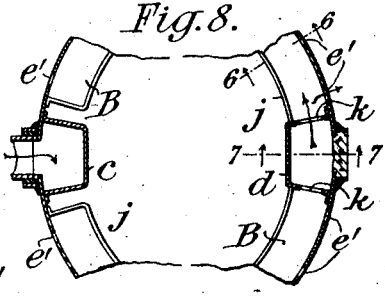
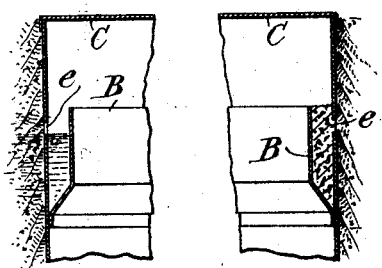
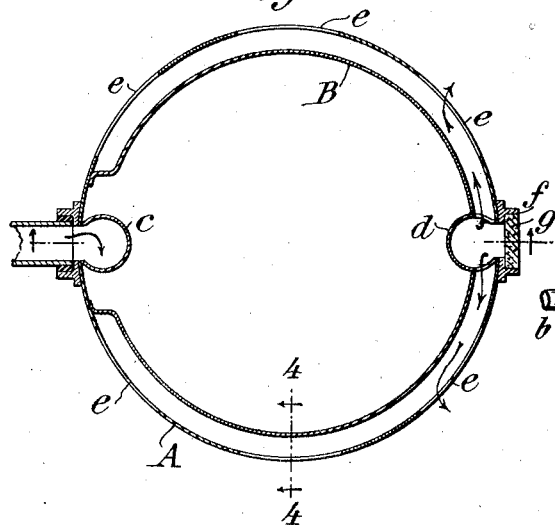
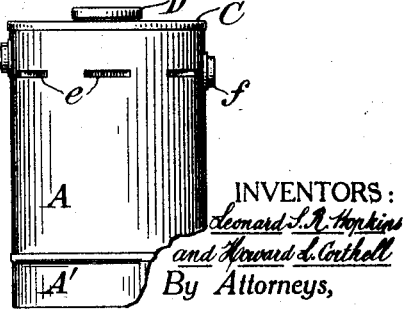
INVENTORS:
Leonard S. R. Hopkins
and Howard L. Corthell
By Attorneys,
Fraser, Myers & Manley Patented Mar. 29, 1927.

1,622,646

UNITED STATES PATENT OFFICE.

LEONARD S. R. HOPKINS, OF NEW YORK, AND HOWARD L. CORTHELL, OF BRONXVILLE, NEW YORK, ASSIGNORS TO BACTERIAL SEWAGE PURIFICATION COMPANY, OF NEW YORK, N. Y., A CORPORATION OF NEW YORK.

BACTERIAL SEWAGE TANK.

Application filed May 13, 1926. Serial No. 108,809.

This invention provides a tank for use in individual sewage systems, and particularly those known as bacterial sewage disposal systems.

The tank is an upright vessel having an inlet for sewage and an annular gutter for distributing the outflow circumferentially around the upper part of the tank, and from which the effluent is discharged through holes or slots into the surrounding soil. For those instances in which it is impracticable or undesirable to so discharge the effluent immediately around the tank, an outlet conduit may be connected to the tank leading to a siphon chamber, or otherwise directed to a tile distributing system.

The accompanying drawings show the preferred embodiment of the invention.

Figure 1 is a vertical mid-section, a part of the gutter being broken away.

Fig. 2 is a horizontal section on the line 2—2 in Fig. 1.

Fig. 3 is an elevation on a reduced scale.

Fig. 4 is a fragmentary transverse section on the line 4—4 in Fig. 2.

Fig. 5 is a similar section to Fig. 4 but showing the gutter filled with concrete.

Figs. 6, 7 and 8 show a modified construction.

The tank A is shown as an upright cylinder of metal plate having an inlet at $a$ for the sewage from a sewer pipe $b$; a vertical deflector or guard $c$ is provided to receive the sewage from the inlet $a$ and direct it downwardly into the body of liquid sewage within the tank. For the outflowing sewage there is provided a similar upright passage formed by a partition $d$. Parts $c$ and $d$ are preferably open at both top and bottom. Within the tank is formed an annular gutter B consisting of two trough-like portions formed of plates riveted or otherwise attached within the tank and open at their ends to the interior of the outlet conduit $d$, while closed at their opposite ends short of the inlet conduit $c$, as shown in Fig. 2. The effluent sewage ascends through the conduit $d$ and flows into the two branches of the gutter B, flowing around in these, and, when its level rises sufficiently, flowing out through slots or perforations $e$, $e$ formed in the outer walls of the tank. The effluent thus emerges into the soil directly surrounding the tank and near the upper part of the latter.

It is preferable to cover over the tank as with a top C permanently united to it and a lid D applied over a central opening in the top, and by removing which, access is had to the interior of the tank. The tank may have a bottom or be bottomless, as desired. It is adapted for use as a leaching cesspool when the soil is suitable for such use, and in such case the bottom of the tank is open to the soil, simply resting upon the soil or sub-soil at the bottom of the excavation. For an anaerobic septic tank the bottom may be closed, unless it rests upon an impervious soil such as clay. For this purpose the bottom may be concreted, as shown at E. Ordinarily, the solid matters in the sewage will precipitate as sludge in the bottom portion of the tank, where indicated at F. In such septic tanks, ordinarily the liquid sewage is overlaid by a layer of froth, and the gutter B should be carried high enough so that the froth will not overflow it and get into the gutter proper. In order that the capacity of the tank may be conveniently varied, it is desirable to make it with one (or more than one) lower section A' which may be removed or omitted for a reduced capacity, or applied for the full capacity; or two or more such annular portions may be applied to afford a further increased capacity.

An advantage of the present invention is that it provides a tank which may be used according to different systems as may be desirable under different conditions. Thus, where the soil is extremely dense, such as a clay soil, it will be impracticable to have the effluent overflow immediately around the tank through the outlet openings $e$; and for this purpose an outlet collar $f$ is provided in communication with the interior with the conduit $d$, and preferably diametrically opposite the inlet. The outlet through this collar is stopped with a plug $g$ when used in the manner already described; this plug may be of cement or otherwise; but when the soil is such that discharge through the openings $e$, $e$ is impracticable, then the outlet $f$ is fitted with a discharge pipe or tile $h$, as shown in dotted lines in Fig. 1. This pipe $h$ leads off to any suitable means for disposing of the overflowing sewage, such as a tile field. For use in this manner it is necessary to stop the openings $e$, $e$, and this can best be done by filling the gutter B with concrete, as is shown in Fig. 5, the concrete in this case ending at the discharge conduit $d$ so as not to obstruct this conduit. It results that the effluent ascends the conduit $d$ and flows out by gravity through the discharge pipe $h$. Thus, for installing an individual house sewage system, the same tank A is applicable so that it may be shipped to the site in advance of the excavation and before knowing the precise nature of the soil; when the excavation is made the expert can then determine whether it will be suitable to discharge the sewage through the openings $e$ or whether it will be necessary to resort to a tile field or other method of disposal; and he can then either plug the outlet $f$ if the first use is decided upon, or fill the gutter B and apply a discharge pipe $h$ and appurtenances if the second method is decided upon.

A slightly different construction is shown in Figs. 6, 7 and 8, where the upright conduits $c$ and $d$ at the inlet and outlet respectively are of different shape and the gutter B is of simpler form, being constructed of a plate $j$ (Fig. 6) in the form of a segment of a cone, and the outflow into the gutter occurring through openings $k$ (Fig. 7) in each side of the upright conduit $d$. The outflow from the tank, instead of being through slots $e$, is through a row of perforations $e'$ to the same effect. The operation is the same as in the construction first described.

We claim as our invention:

1. A sewage tank consisting of an upright vessel having at its upper part an annular gutter, an inlet to said vessel, an outlet conduit opening from the interior of the vessel and communicating with the gutter in the level thereof to discharge sewage thereinto, and discharge openings from said gutter for discharging effluent around the tank.

2. A tank according to claim 1, having an outlet opening communicating with said outlet conduit, said opening adapted for connection to a discharge pipe.

3. A tank according to claim 1, the annular gutter formed interiorly of the tank and the discharge openings from said gutter formed through the tank and around its circumference.

4. A tank according to claim 1, the outlet opening from the tank into the gutter being below the level of the discharge openings from the gutter.

5. A tank according to claim 1, having an outlet opening from the outlet conduit, and means for closing it when the discharge is to occur from the discharge openings from the gutter.

6. A sewage tank consisting of an upright vessel having at its upper part an internal annular gutter, upright passages alongside the walls of the vessel, an inlet to the vessel entering one of said passages, an outlet from the vessel from the other of said passages, and the latter passage having lateral communication with said gutter.

7. A sewage tank consisting of an upright vessel having at its upper part an internal annular gutter, upright passages alongside the walls of the vessel, an inlet to the vessel entering one of said passages, openings between the other of said passages and the gutter to admit an outflow from the tank into the gutter, and discharge openings from the gutter through the wall of the tank.

In witness whereof, we have hereunto signed our names.

LEONARD S. R. HOPKINS.
HOWARD L. CORTHELL.